US011660240B2

United States Patent
Villarreal Suarez et al.

(10) Patent No.: US 11,660,240 B2
(45) Date of Patent: May 30, 2023

(54) WHEELCHAIR SYSTEMS AND METHODS ENABLING FINE MANUAL MOTION CONTROL

(71) Applicant: Toyota Motor North America, Inc., Plano, TX (US)

(72) Inventors: Dario Jose Villarreal Suarez, Farmers Branch, TX (US); Sarah Darrow, The Colony, TX (US)

(73) Assignee: Toyota Motor North America, Inc., Plano, TX (US)

( * ) Notice: Subject to any disclaimer, the term of this patent is extended or adjusted under 35 U.S.C. 154(b) by 350 days.

(21) Appl. No.: 16/894,072

(22) Filed: Jun. 5, 2020

(65) Prior Publication Data

US 2021/0378891 A1 Dec. 9, 2021

(51) Int. Cl.
*A61G 5/04* (2013.01)
*A61G 5/10* (2006.01)
(Continued)

(52) U.S. Cl.
CPC ............. *A61G 5/041* (2013.01); *A61G 5/022* (2013.01); *A61G 5/10* (2013.01); *G01G 19/44* (2013.01);
(Continued)

(58) Field of Classification Search
CPC .......... A61G 5/04; A61G 5/041; A61G 5/022; A61G 5/10; A61G 2203/30;
(Continued)

(56) References Cited

U.S. PATENT DOCUMENTS 5,746,282 A * 5/1998 Fujiwara ............. B60L 15/2009
180/6.5
5,937,961 A 8/1999 Davidson
(Continued)

FOREIGN PATENT DOCUMENTS

CN 108309594 A * 7/2018
DE 20310217 U1 9/2003
(Continued)

OTHER PUBLICATIONS

"Can You Push an Electric Wheelchair?", Apr. 9, 2020, 3 pages, https://www.quantumrehab.com/resources/consumer-article-canyou-push-an-electric-wheelchair.asp.

*Primary Examiner* — Steve Clemmons
(74) *Attorney, Agent, or Firm* — Dinsmore & Shohl LLP

(57) ABSTRACT

Systems and methods of wheelchair systems enabling fine manual motion control are disclosed. In one embodiment, a wheelchair system includes a wheelchair. The wheelchair includes one or more wheels, at least one actuator coupled to the one or more wheels, a processing device, and a non-transitory, processor-readable storage medium in communication with the processing device. The non-transitory, processor-readable storage medium includes one or more programming instructions that, when executed, cause the processing device to determine a wheel torque on the one or more wheels, determine a compensation value, and actuate the at least one actuator applying the compensation value to the one or more wheels to remove at least a portion of the wheel torque such that less external force is required to physically move the powered wheelchair than when the compensation value is not applied.

18 Claims, 5 Drawing Sheets

(51) Int. Cl.
  *A61G 5/02* (2006.01)
  *G01G 19/52* (2006.01)
  *G01L 3/00* (2006.01)
  *G01S 19/01* (2010.01)
  *G01S 1/30* (2006.01)
  *G01L 5/00* (2006.01)
  *G01G 19/44* (2006.01)

(52) U.S. Cl.
  CPC .............. *G01G 19/52* (2013.01); *G01L 3/00* (2013.01); *G01L 5/0033* (2013.01); *G01L 5/0038* (2013.01); *G01S 1/306* (2013.01); *G01S 19/01* (2013.01)

(58) Field of Classification Search
  CPC ............ A61G 2203/32; A61G 2203/38; A61G 2203/44; G01G 19/44; G01G 19/52; B62D 51/04; B60L 15/2072; B60L 2200/34
  See application file for complete search history.

(56) References Cited

U.S. PATENT DOCUMENTS

| | | | |
|---|---|---|---|
| 6,112,837 A * | 9/2000 | Kanno | A61G 5/045 73/1.09 |
| 6,148,942 A | 11/2000 | Mackert, Sr. | |
| 6,354,390 B1 * | 3/2002 | Uchiyama | A61G 5/1054 180/907 |
| 8,504,248 B2 * | 8/2013 | Taira | B60L 15/2036 701/49 |
| 8,672,081 B2 * | 3/2014 | Kume | B62B 5/0026 180/19.1 |
| 8,757,308 B2 * | 6/2014 | Bhai | B60L 3/10 701/79 |
| 9,370,706 B2 | 6/2016 | Prassler et al. | |
| 9,604,697 B2 * | 3/2017 | Yeh | B62M 6/45 |
| 9,636,993 B2 * | 5/2017 | Biderman | A63B 21/0058 |
| 9,937,943 B2 * | 4/2018 | Nilsson | B60L 15/20 |
| 10,568,792 B2 * | 2/2020 | Derenne | A61G 7/08 |
| 10,625,818 B2 * | 4/2020 | Kikkawa | B62M 6/50 |
| 10,896,474 B2 * | 1/2021 | Biderman | B60L 58/10 |
| 11,039,964 B2 * | 6/2021 | Paul | A61G 7/0528 |
| 11,079,063 B2 * | 8/2021 | Shehab | F16M 11/2014 |
| 11,154,442 B1 * | 10/2021 | Dean | A61G 5/10 |
| 2011/0015842 A1 * | 1/2011 | Kume | B62B 5/0026 701/67 |
| 2016/0313758 A1 * | 10/2016 | Schmidt | G05G 9/047 |
| 2020/0156482 A1 * | 5/2020 | Savaresi | B60L 15/2081 |
| 2020/0247450 A1 * | 8/2020 | Sailer | B62B 5/0069 |
| 2020/0352815 A1 * | 11/2020 | Raja | B60L 15/2018 |
| 2021/0011484 A1 * | 1/2021 | Park | B62B 5/0096 |

FOREIGN PATENT DOCUMENTS

| | | | | |
|---|---|---|---|---|
| DE | 10309621 A1 * | 9/2004 | | A61G 5/045 |
| EP | 3609768 B1 * | 2/2021 | | B60L 15/2081 |
| JP | H0852177 A * | 2/1996 | | |
| JP | 2000237244 A * | 9/2000 | | |
| JP | 2002200121 A | 7/2002 | | |
| JP | 2020099379 A * | 7/2020 | | |
| KR | 20160103634 A * | 9/2016 | | |
| WO | 2006054608 A1 | 5/2006 | | |
| WO | WO-2013041666 A1 * | 3/2013 | | A61G 5/04 |

\* cited by examiner

WHEELCHAIR SYSTEMS AND METHODS ENABLING FINE MANUAL MOTION CONTROL

TECHNICAL FIELD

The present disclosure generally relates to wheelchairs and, more specifically, to wheelchair systems enabling fine manual motion control.

BACKGROUND

Wheelchairs, such as power wheelchairs, enable those who are unable to walk on their own travel from one place to another. One type of wheelchair is a power wheelchair having one or more motors that allow a user to control the power wheelchair so that it moves under motorized control. Power wheelchairs are useful for people who are unable to use their arms to propel the wheelchair.

In some cases, a user may desire to make fine movements to adjust his or herself into a proper position. One example of such a situation is when the user wishes to pull up to a table, such as a dining table. The user may want to be positioned perpendicular with respect to the dining table, as well as a certain preferred distance from the dining table. However, the motor control of the power wheelchair may not have fine enough motion control, and it may be difficult for the user to get into the desired position with respect to the dining table. It may take the user several attempts to position the power wheelchair into the desired position, which may be frustrating.

Further, due to the weight of the power wheelchair, its bulky size, and the torque required to move the wheels, a user cannot easily push or pull the power wheelchair into a desired position.

Accordingly, a need exists for alternative power wheelchairs that enable fine control that is easily performed by a user.

SUMMARY

In one embodiment, a wheelchair system includes a wheelchair. The wheelchair includes one or more wheels, at least one actuator coupled to the one or more wheels, a processing device, and a non-transitory, processor-readable storage medium in communication with the processing device. The non-transitory, processor-readable storage medium includes one or more programming instructions that, when executed, cause the processing device to determine a wheel torque on the one or more wheels, determine a compensation value, and actuate the at least one actuator applying the compensation value to the one or more wheels to remove at least a portion of the wheel torque such that less external force is required to physically move the powered wheelchair than when the compensation value is not applied.

In another embodiment, a powered wheelchair system including a powered wheelchair. The powered wheelchair includes a frame, one or more wheels coupled to the frame, at least one actuator coupled to the one or more wheels, a wheelchair weight sensor and a surface sensor coupled to the frame, a processing device, and a non-transitory, processor-readable storage medium in communication with the processing device. The non-transitory, processor-readable storage medium includes one or more programming instructions that, when executed, cause the processing device to determine a wheel torque on the one or more wheels based on a weight of the wheelchair, a weight of a user, and a type of surface in contact with the one or more wheels, determine a compensation value based on the determined wheel torque, and remove the determined wheel torque such that less external force is required to physically move the powered wheelchair than when the compensation value is not applied.

In yet another embodiment, a method of operating a powered wheelchair includes determining a wheel torque on one or more wheels of the powered wheelchair, determining a compensation value based on the determined wheel torque, and actuating at least one actuator applying the compensation value to the one or more wheels to at least partially remove the determined wheel torque.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The systems and methods described herein generally relate to a powered wheelchair configured to enable fine manual motion control. The fine manual motion control allows a user of the power wheelchair to make small adjustments of the power wheelchair to place the power wheelchair in a desired position. Present power wheelchairs do not have fine motion control, which may make it difficult for a user to position the power wheelchair at a desired location or orientation. As a non-limiting example, the user may wish to orientate the power wheelchair at a certain orientation with respect to a dining table. It may take several attempts to control the motor of the power wheelchair to get the power wheelchair into the desired orientation due to lack of fine motor control. Further the weight of the power wheelchair and the user, along with other factors, may require significant force to overcome the wheel torque to physically push or pull the wheelchair into a desired location or orientation. As a non-limiting example, a user may desire to control the power wheelchair by motorized control up to an object, such as a dining table. After controlling the power wheelchair such that it is positioned at the dining table, the use may desired to grab the table and apply force with respect to the dining table, such as by pushing and pulling on the dining table, to move the power wheelchair into a desired orientation. However, the force required to physically move the power wheelchair in such a manner may be too much for the user to overcome.

Embodiments solve this problem by applying a compensation value to the actuator (e.g., motor) of the power wheelchair that compensates for the wheel torque such that the wheel torque is effectively removed from the wheel(s) of the power wheelchair. Thus, the user is able to freely push and pull the power wheelchair into a desired location and orientation, such as a desired location and orientation with respect to a dining table, after coarsely positioning the power wheelchair to the desired location and orientation using the actuator of the power wheelchair.

Various embodiments of power wheelchairs enabling fine manual motion control are described in detail herein.

As used herein, the term "communicatively coupled" may mean that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 1:
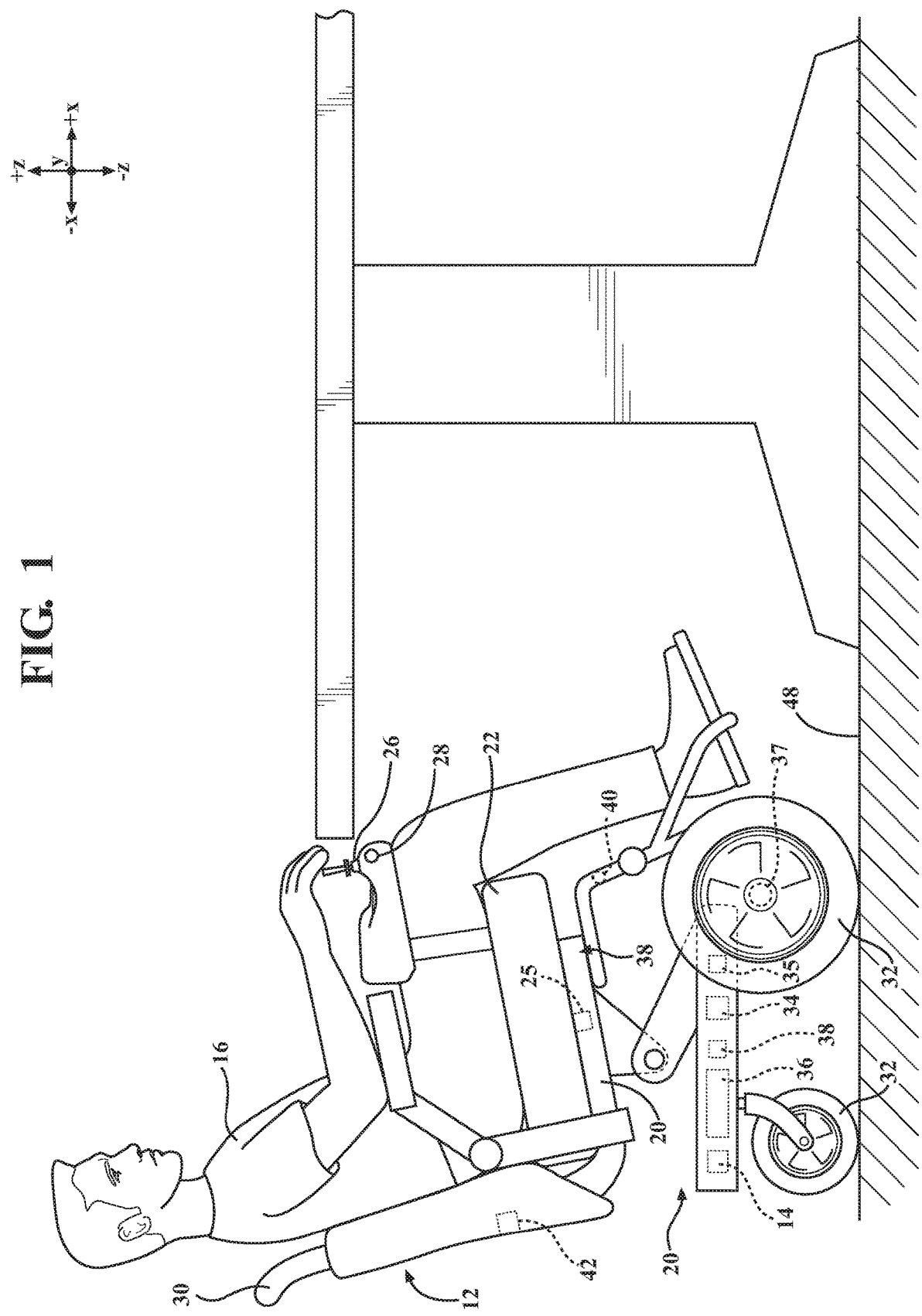
FIG. 1 schematically depicts an example wheelchair system proximate an immovable object according to one or more embodiments described and illustrated herein.

As used herein, the term "system longitudinal direction" refers to the forward-rearward direction of the system (i.e., in a +/−X direction of the coordinate axes depicted in FIG. 1). The term "system lateral direction" refers to the cross-direction (i.e., along the Y axis of the coordinate axes depicted in FIG. 1), and is transverse to the longitudinal direction. The term "system vertical direction" refers to the upward-downward direction of the system (i.e., in the +/−Z direction of the coordinate axes depicted in FIG. 1). As used herein, "upper" or "uppermost" is defined as generally being towards the positive Z direction of the coordinate axes shown in the drawings. "Lower" or "lowermost" is defined as generally being towards the negative Z direction of the coordinate axes shown in the drawings.

Referring initially to FIG. 1, a schematic depiction of a wheelchair system, generally designated 10, is provided. The system 10 generally includes a wheelchair 12. The wheelchair includes a control unit 14. The wheelchair 12 is a powered wheelchair that includes motorized components that allow a user 16 to electronically control movement of the wheelchair. Accordingly, various components of the wheelchair 12 should be understood and are not described in further detail herein. In some embodiments, the wheelchair 12 may include a power base portion 20, a frame 22, and a seat portion 24 supported by the frame 22, which in turn is supported by the power base portion 20. Thus, the frame 22 is generally positioned below the seat portion 24 in a system vertical direction (i.e., positioned in the −Z direction of the coordinate axes of FIG. 1 relative to the seat portion 24) and the power base portion 20 is generally positioned below the frame 22 in a system vertical direction (i.e., positioned in the −Z direction of the coordinate axes of FIG. 1 relative to the frame 22).

Still referring to FIG. 1, in some embodiments, the power base portion 20 may raise, tilt, or otherwise move the frame 22 and thus the seat portion 24. The frame 22 and the seat portion 24 are generally configured to support the user 16 when the user 16 is seated in the wheelchair 12. In some embodiments, the seat portion 24 may include a pair of armrests 26 to which a controller 28 may be coupled. As described herein, a controller 28 may provide the user 16 with an ability to control movement of the wheelchair 12. In some embodiments, the controller 28 may be a joystick-type controller where the user 16 directs the joystick in accordance with a desired direction and/or speed of travel. Accordingly, the controller 28 may be communicatively coupled to the power base portion 20, including various components thereof, to transmit signals to the power base portion 20 to cause the wheelchair 12 to respond according to the inputs received by the controller 28. It should be understood that the joystick configuration is merely illustrative, and in some embodiments, the controller 28 may utilize other designs, such as buttons, switches, voice controls, breath controls, and/or the like to receive inputs from a user 16 via a user interface and the like.

In some embodiments, the seat portion 24 may include one or more handles 30 integrated therein or coupled thereto. The one or more handles 30 may provide an area for a user (e.g., a caregiver) to grip the wheelchair 12. For example, at least one of the one or more handles 30 may be located on a back portion of the seat portion 24 such that a user may grasp the one or more handles 30 when moving behind the wheelchair 12.

The power base portion 20 may include, but is not limited to, one or more wheels 32, an actuator 34, a battery 36, and the control unit 14. The control unit 14 may be an electronic control unit and may generally be a control device that controls the wheelchair 12 and/or one or more components thereof. As such, the control unit 14 may be communicatively coupled to the various components of the wheelchair 12 such that one or more control signals can be transmitted from the control unit 14 to the various components such as the actuator 34, as described in greater detail herein. The actuator 34, which may be configured as one or more motors, is coupled to the wheels 32 to drive movement of the wheels 32. The battery 36 may generally provide electrical power to the various components of the wheelchair 12, such as the actuator 34. Further, in some embodiments, the power base portion 20 may include a position sensor 40, such as a global position system (GPS) device that is configured to transmit the location of the wheelchair 12 and/or receive the position of other objects relative to the wheelchair 12. Other components of the power base portion 20 should generally be understood and are not described in further detail herein.

The one or more wheels 32 may be configured as any type of wheel. As a non-limiting example, the one or more wheels 32 may be omni-directional wheels, which may enable a user to easily move the wheelchair 12 in any direction when it is in the fine manual motion control described below.

The control unit 14 may generally be a standalone control device that contains one or more components for controlling movement of the wheelchair 12. It should be appreciated that while the control unit is shown in FIGS. 1-4 as part of the power base portion 20 of the wheelchair 12, this is a non-limiting example. That is, the control unit 14 may be a device that is separate from the power base portion 20, such as a device that is coupled to or integrated with the pair of armrests 26, the seat portion 24, and/or the like. In some embodiments, the control unit 14 may be separate from the wheelchair 12 altogether, such as, for example, a user carried computing device, the user's mobile device, and/or the like.

Figure 3A:
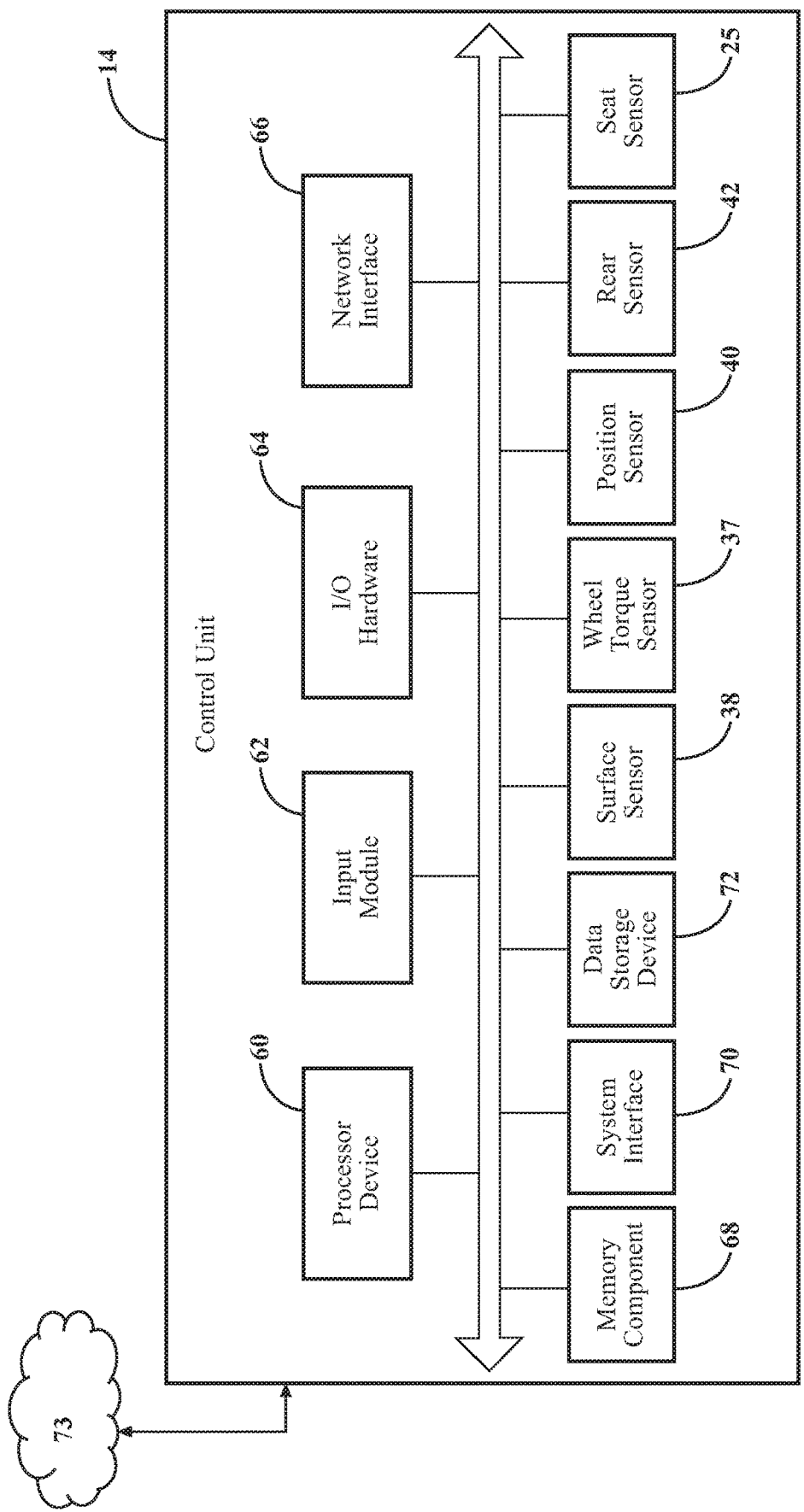
FIG. 3A schematically depicts components of an example control unit of an example wheelchair system according to one or more embodiments described and illustrated herein.

Referring to FIGS. 1 and 3A, various illustrative components of the control unit 14 are schematically depicted. In various embodiments, the control unit 14 includes a network interface 66, a processing device 60, a data storage device 70, and a memory component 68. The processing device 60, such as a computer processing unit (CPU), may be the central processing unit of the control unit 14, performing calculations and logic operations to execute a program. The processing device 60, alone or in conjunction with the other components, is an illustrative processing device, computing device, processor, or combination thereof. The processing device 60 may include any processing component configured to receive and execute instructions (such as from the memory component 68).

The network 73 may include a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connected the control unit 14 to other components.

In some embodiments, the memory component 68 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 68 may be a non-transitory, processor-readable memory. The memory component 68 may include one or more programming instructions thereon that, when executed by the processing device 60, cause the processing device 60 to complete various processes, such as one or more of the processes described herein with respect to FIG. 4.

Figure 3B:
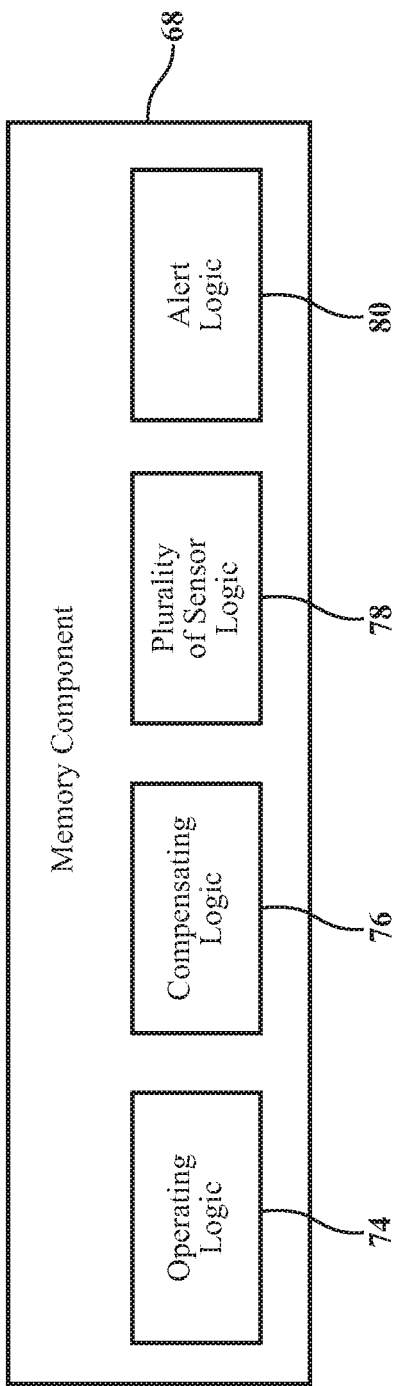
FIG. 3B schematically depicts logic modules of an example memory component of the example wheelchair system of FIG. 3A according to one or more embodiments described and illustrated herein.

Referring to FIG. 3B, the programming instructions stored on the memory component 68 may be embodied as one or more software logic modules, where each logic module provides programming instructions for completing one or more functions, such as the functions described in greater detail below with respect to FIG. 4. For instance, a wheelchair operating logic module 74 may include one or more different pieces of logic, each of which may be embodied as a computer program, firmware, and/or software/hardware, which may be executable by the processing device 60 to cause the wheelchair 12 to move and/or orientate itself with respect to commands provided by the user 16.

A compensating logic module 76 may include one or more pieces of logic, each of which may be embodied as a computer program, firmware, and/or software/hardware, which may be executable by the processing device 60 to calculate a compensation value used to eliminate or otherwise remove wheel torque from one or more wheels of the wheelchair 12 so that the user 16 may push and/or pull the wheelchair 12 to effectuate fine movements of the wheelchair 12 to get the wheelchair 12 into a desired position.

A sensor logic module 78 may include one or more pieces of logic, each of which may be embodied as a computer program, firmware, and/or software/hardware, which may be executable by the processing device 60 to receive a process signals and/or data from one or more sensors, such as the sensors illustrated in FIGS. 1 and 3A.

An object detection logic 80 may include one or more pieces of logic, each of which may be embodied as a computer program, firmware, and/or software/hardware, which may be executable by the processing device 60 to receive sensor data (e.g., image data from a camera) to detect objects surrounding the wheelchair 12. As described in more detail below, the object detection logic 80 may use sensor data to detect immovable objects that may cause the wheelchair to go into a fine manual motion control mode wherein the user 16 can apply force to the immovable object to finely move the wheelchair 12 into a desired position. As used herein an "immovable object" means an object that is difficult for a user seated in a wheelchair 12 to move. Non-limiting examples of immovable objects include a table, a desk, a bed, a wall, a chifferobe, an armoire, a dresser, a buffet, a credenza, a bed, a futon, a billiards table, a craps table, a roulette table, a vanity, a dry sink, a piano, a harpsichord, an organ, a Hoosier cabinet, and the like.

Referring once again to FIG. 3A, an input module 62 is provided to enable the user 16 to input controls into the control unit 14 and thus the wheelchair 12. The input module 62 may be communicatively coupled to the controller 28 and/or another input device (e.g., switch 27), as described in more detail below. The input module 62 may communicate input signals to the processing device 60, for example, such that the user 16 may use the controller 28 to move the wheelchair via the actuator 34. Thus, it should be appreciated that the user controls, as discussed in greater detail herein, may be transmitted to the control unit 14 through the input module 62. Further, it should be appreciated that the user 16 may select the user controls by a button, such as a push button, a switch, such as a toggle switch, and the like on the wheelchair 12 including from on the pair of armrests 26 or from a program selection initiated at an external device such as a portable computing device, smartphone, or the like by way of the network interface described below 66.

The network interface 66 of the control unit 14 may include any wired or wireless networking hardware, such as a modem, LAN port, wireless fidelity (Wi-Fi) card, WiMax card, mobile communications hardware, and/or other hardware for communicating with other networks and/or devices. Therefore, the communication between the control unit 14, the wheelchair 12, and/or other external devices may be provided through the network interface 66.

The data storage device 70, which may generally be a storage medium, may contain one or more data repositories for storing data that is received and/or generated, and may be any physical storage medium, including, but not limited to, a hard disk drive (HDD), memory, removable storage, and/or the like. While the data storage device 70 is depicted as a local device, it should be understood that the data storage device 70 may be a remote storage device, such as, for example, a server computing device or the like. Illustrative data that may be contained within the data storage device 70 is described below with respect to FIG. 3C and includes, but is not limited to, wheel torque data 82, rear sensor data 84, seat weight data 86, surface data 88, position data 90, and image data 92.

Referring again to FIGS. 1 and 3A, the wheelchair 12 may include a plurality of sensors that provide sensor data to effectuate the functionalities described herein. The plurality of sensors include, but are not limited to, a surface sensor 38, a wheel torque sensor 37, a rear sensor 42, an image sensor 43, and a seat sensor 25. It should be understood that more or fewer sensors may be provided.

The surface sensor 38 is operable to produce surface data 88 that is indicative of the type of surface 48 the wheelchair 12 is operating on. Different surfaces have different coefficients of friction with respect to the one or more wheels 32 and thus create different wheel torque on the one or more wheels 32. Non-limiting surface include tile floors, laminate floors, wood floors, decking, concrete surfaces, Earth surfaces, gravel surfaces, and the like. The type of surface may be used to calculate the wheel torque that is compensated for, as described in more detail below. As a non-limiting example, the data storage device 70 may store example coefficients of friction for different surface types. The surface sensor 38 may be, for example, an image sensor that creates image data of the surface 48. As a non-limiting example, the surface sensor 38 may be positioned under the seat portion 24 and have a field of view of the surface 48. This image data may be used by control unit 14 to determine the type of surface. Any object recognition algorithm may be used to determine the type of surface. It should be understood that some embodiments do not include a surface sensor 38 and thus the compensation value described below does not factor in the type of surface.

Some embodiments include a wheel torque sensor 37 wherein the actual wheel torque for the one or more wheels 32 are measured. Example wheel torque sensors 37 include, but are not limited to wheel torque transducers, force detectors, rotational sensors, angle sensors, and the like, that are configured to detect or sense a wheel torque. It should be understood that in embodiments that directly measure the wheel torque the other sensors described herein may not be utilized because the wheel torque is directly measured rather than calculated.

The wheelchair may also include a position sensor 40, which may be configured as a GPS sensor, for example, The position sensor 40 provides data regarding the location of the wheelchair 12 in the environment. The position of the wheelchair 12 may be useful in determining objects surrounding the wheelchair 12. The position sensor 40 may also include other sensors, such as a wireless Bluetooth® sensor operable to communicate with wireless Bluetooth® beacons to triangulate the position of the wheelchair 12, and determine the location of the wheelchair 12 with respect to objects. Such a wireless position sensors 40 may be useful in indoor applications, and in detecting immovable object for which the user may use for fine manual motion control of the wheelchair 12.

The rear sensor 42, if provided, may be located at a rear of the wheelchair 12 (e.g., on the seatback) and may produce data indicative of objects behind the wheelchair 12. In a non-limiting example, the rear sensor 42 is an image sensor that produces image data that can be processed using an object detection algorithm to detect objects, such as undesirable objects that lead to an undesirable situation, as described in more detail below with respect to the flowchart 400 of FIG. 4. It should be understood that embodiments may also not include a rear sensor 42.

The wheelchair 12 may also include a seat sensor 25 that is operable to measure the weight of the user sitting in the wheelchair 12. Any weight measuring sensor may be used as the seat sensor 25. As described in more detail below, the weight of the user 16 and the wheelchair 12 itself may be used to calculate or otherwise determine the wheel torque of the one or more wheels 32.

Figure 3C:
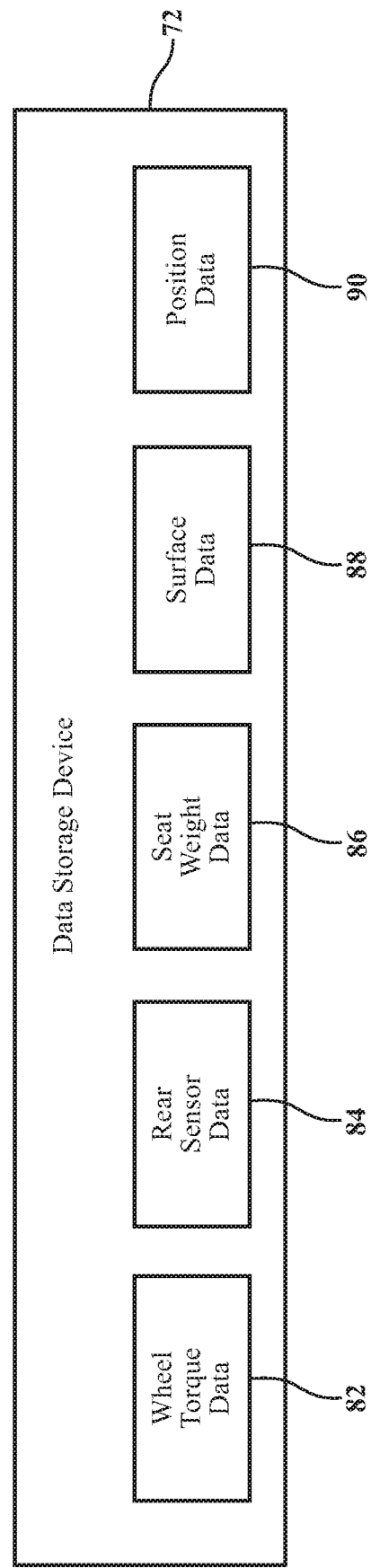
FIG. 3C schematically depicts example data stored within an example data storage device of the example wheelchair system of FIG. 3A according to one or more embodiments described and illustrated herein.

Referring now to FIG. 3C, the data storage device 70 may store data to perform the functionalities described herein, such as determining wheel torque and compensation values to compensate for said wheel torque. Embodiments may include some, all, or more than the data depicted in FIG. 3C.

Wheel torque data 82 may be data read from the wheel torque sensor(s) 37 (i.e., measured torque data), if provided. The wheel torque data 82 may also include calculated wheel torque data rather than measured torque data that is measured by a torque sensor(s). Historical wheel torque data 82 may be stored in the data storage device, which may be used by the control unit 14 to learn what wheel torque is present on different types of surfaces, for example.

The rear sensor data 84 produced by the rear sensor 42, if provided, may also be stored in the data storage device 70. As stated above and described in more detail below, the rear sensor data 84 may be used to detect undesirable objects and/or conditions, and remove the compensation value from the actuator 34 such that the wheelchair 12 is operated in a standard mode.

Other data in the form of seat weight data 86 (i.e., the weight of the user) produced by the seat sensor 25, surface data 88 (e.g., image data of the surface) produced by the surface sensor 38, position data 90 produced by the position sensor 40 and image data 92 produced by the image sensor 43, if such sensors are provided. Such data may be used to determine the compensation value, as described in more detail below with respect to FIG. 4.

Referring once again to FIG. 1, the user 16 of a wheelchair 12 may use motorized control to move the wheelchair 12 to a desired object, such as a table 100, and coarsely position the wheelchair 12 with respect to the table 100. However, the wheelchair 12 may not be ideally positioned with respect to the table 100. For example, the wheelchair 12 may be too close or too far from an edge 102 of the table. As another example, the wheelchair may be angled at an undesirable angle on the y-axis with respect to the table 100. Thus, the user 16 may wish to reposition the wheelchair 12 with respect to the table 100 by using fine motion control. However, the actuator 34 of the wheelchair may not provide fine enough control to make the proper adjustments.

Figure 4:
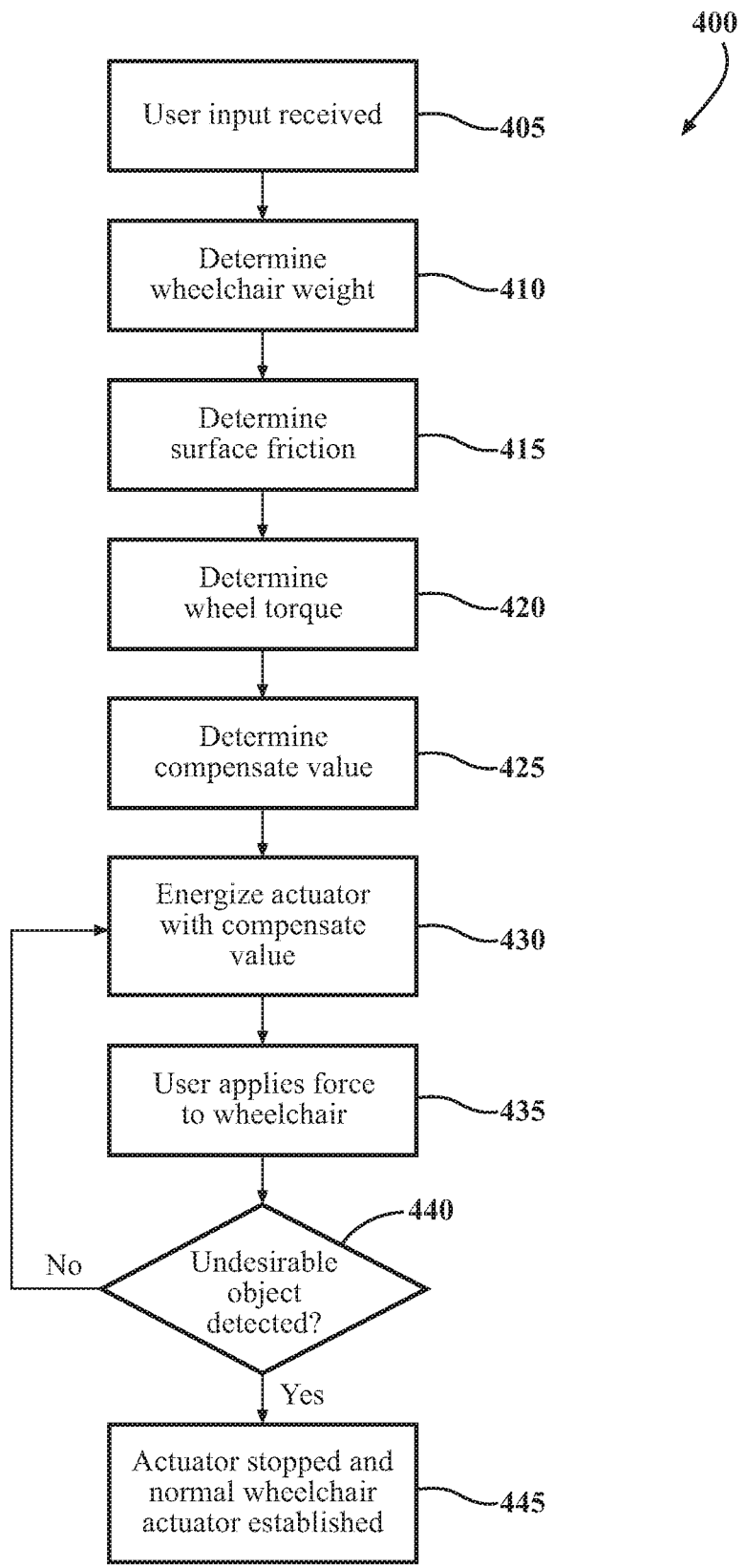
FIG. 4 graphically depicts a flowchart of an example method of a wheelchair system enabling fine manual motion control according to one or more embodiments described and illustrated herein.

Referring now to FIG. 4, an example method is illustrated by a flowchart 400. After the user 16 has navigated the wheelchair to the desired object and wishes to enable a fine manual motion control mode, the user 16 may use an input device (e.g., a switch 27, the controller 28, or any other input device) at block 405 to enter the fine manual motion control mode that reduces the wheel torque on the one or more wheels 32 such that the wheelchair 12 may be easily pushed and pulled into position. It should be understood that the user may enter the fine manual motion control mode at any time, and he or she does not need to first navigate to an immovable object.

In some embodiments, the wheelchair 12 may automatically enter the fine manual motion control mode without a user input. In such embodiments, immovable objects are detected using the image data 92 produced by the image sensor 43 and, once detected and the user has stopped motorized movement of the wheelchair 12, the fine manual motion control mode is enabled. For example, any object recognition algorithm may be used to detect and classify certain immovable objects. In some embodiments, the position sensor 40 is used in lieu of, or in addition to, the image sensor 43 to detect when the user has approached an immovable object.

In the example of FIG. 1, the user 16 may have driven the wheelchair 12 up to the table 100 using the actuator 34. Image data 92 and/or position data is used to recognize that the wheelchair 12 is proximate the table 100. After a short period of time (e.g., 1 to 5 seconds), the wheelchair 12 may automatically enter the fine manual motion control mode. In some embodiments, the wheelchair 12 may notify the user 16 that the wheelchair 12 has entered the fine manual motion control mode.

After receiving user input to enter the fine manual motion control mode (or the fine manual motion control mode is automatically initiated), a wheelchair and user weight is determined at block 410. In some embodiments, the wheelchair weight is known a priori and stored within the data storage device 70, for example. In non-limiting example, the wheelchair weight is provided by the manufacture of the wheelchair. The user weight may be determined using the seat sensor 25 as described above. The total of the wheelchair weight and the user weight is determined at block 410. In some embodiments, the seat sensor 25 is capable of directly measuring both the wheelchair weight and the user weight. This may accommodate for additional items that the user may store in storage compartments of the wheelchair 12, for example.

At block 415 a surface type is determined, such as by using the surface sensor 38. It is noted that, in some embodiments, the surface type is determined using only an image sensor 43 rather than a dedicated surface sensor 38. As described above, a detected surface type may have a coefficient of friction associated therewith. Thus, a coefficient of friction corresponding with the detected surface type is retrieved.

Next, at block 420 a wheel torque of the one or more wheels 32 is determined. The wheel torque may be calculated using the wheelchair and user weight and the retrieved coefficient of friction. Other characteristics of the wheelchair 12 may also be used to calculate the wheel torque, such as the actual rotational force applied to the wheel, the forces exerted onto the wheel, the torque currently being generated around the wheel, and/or the like. It should be understood that the wheel torque may be estimated without using the wheelchair and user weight and/or the surface coefficient of friction. Thus, blocks 410 and/or 415 may be skipped. In yet other embodiments, the wheel torque may be directly measured using one or more wheel torque sensors 37 and thus blocks 410 and 415 are not utilized.

At block 425 a compensation value is calculated. The compensation value is calculated to at least partially remove the wheel torque required to manually move the one or wheels 32 and thus the wheelchair 12. In some embodiments, a model of the wheelchair 12 is used to calculate the amount of wheel torque and thus the compensation value using the sensor data as described above. As such, the compensation value may be equal to, less than or greater then the calculated amount of wheel torque. Any method of calculating the compensation value that counters the wheel torque may be utilized.

The compensation value is transformed to a control signal that is applied to the actuator 34, which may be one or more motors controlling the movement of the one or more wheels 32, to counter the wheel torque. At block 430, a control signal corresponding to the compensation value is used to energize the actuator 34 to remove the presence of the wheel torque on the one or more wheels 32. This enters the wheelchair 12 into the fine manual motion control mode. When in fine manual motion control mode, at least a portion of the wheel torque is removed such that less external force is required to physically move the wheelchair 12 than when the compensation value is not applied.

A user is free to apply force against an object, such as an immovable object, to easily move the wheelchair 12 into a desired position. Referring back to FIG. 2, the user 16 may have determined that he is too close to the table and may wish to back up. Thus, he pushes against the edge 102 of the table 100 in the positive x-axis direction to move the wheelchair 12 in a negative x-axis direction as indicated by arrow A. The actuator 34 is energized according to the compensation value to allow the wheelchair 12 to move in the desired direction. The user 16 may also pull himself toward the table 100 or use uneven force between two hands to turn the wheelchair 12 along the y-axis to obtain a desired position.

Figure 2:
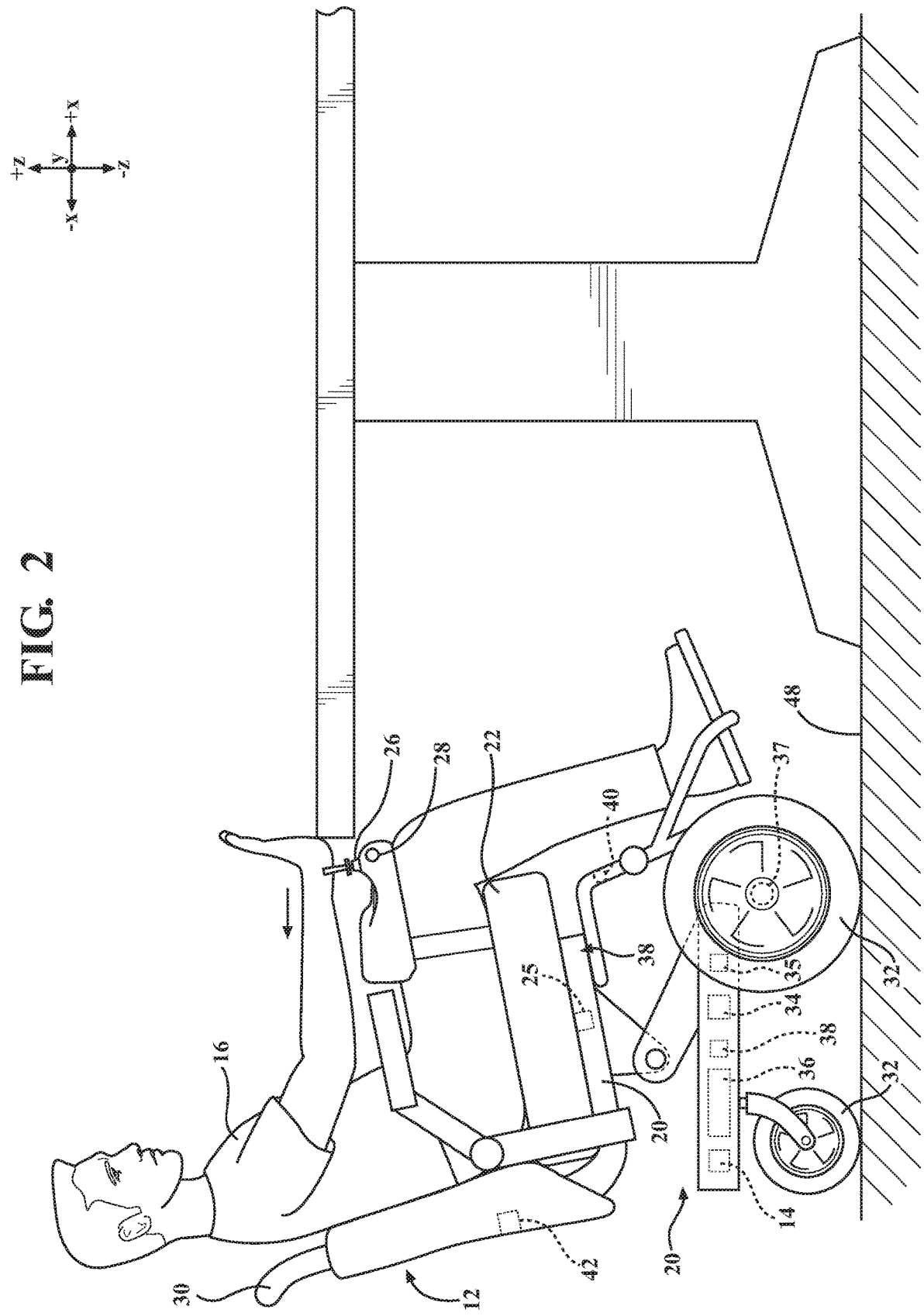
FIG. 2 schematically depicts the example wheelchair system of FIG. 1 wherein a user is pushing a wheelchair away from the immovable object according to one or more embodiments described and illustrated herein.

In some embodiments, one or more sensors of the wheelchair may sense a force vector applied to the wheelchair 12, and the control unit 14 may use the sensed force vector and the compensation value to provide one or more control signals to the actuator(s) to assist in the movement of the wheelchair 12 in the desired direction. As a non-limiting example, sensors in the one or more wheels (e.g., a wheel torque sensor 37 as shown in FIGS. 1 and 2) may sense a force being applied to the wheelchair 12 by the user pushing or pulling on an object, such as an immovable object. The direction and magnitude of the sensed force may be used to calculate a force vector, which is then used to calculate the compensation value and direction to overcome the wheel torque in the desired direction of movement of the user 16. In the example of FIG. 2, one or more sensors may sense attempted movement in the negative x-direction at some level of force. The sensor information is used to control the actuator 34 to move the wheelchair 12 in the desired direction at a speed corresponding to the sensed level force. In this manner, the user 16 can freely adjust the position of the wheelchair 12 as if the wheelchair 12 were much lighter and had freely moving caster wheels.

In some embodiments, the wheelchair 12 is configured to detect an undesirable object or condition, and automatically cause the wheelchair 12 to exit the fine manual motion control mode. For example, one or more sensors may be used to detect an undesirable object or an undesirable condition. Non-limiting examples of the sensors used to detect the undesirable object or undesirable condition include the rear sensor 42 and the image sensor 43 shown in FIGS. 1 and 2. Image data from the one or more sensors may be used to detect undesirable objects. The phrase "undesirable object" as used herein means any object that the user may inadvertently bump into while in the fine manual motion control mode. Non-limiting examples of undesirable objects include a pet that happens to be walking behind the wheelchair 12, an object deemed to be easily tipped over, stairs leading downward, or an object that may cause damage to the wheelchair 12. Embodiments are not limited by the type of undesirable object.

At block 440 it is determined whether or not an undesirable object is detected. If not, the process continues in a loop by returning to block 430. If an undesirable object is detected, the process moves to block 445 where the compensation value is removed from the actuator and the wheelchair 12 exits the fine manual motion control mode. Thus, interaction between the wheelchair 12 and the undesirable object may be avoided. It is noted that, although not shown in FIG. 4, the wheelchair 12 may exit the fine manual motion control mode upon receipt of a user input. For example, the user may use the controller 28 or another user input device (e.g., switch 27).

It should now be understood that the systems and methods described herein provide a wheelchair capable of entering a fine manual motion control mode when the user approaches an object such that the user may physically adjust the position of the wheelchair to a desired position. Embodiments determine a wheel torque of one or more wheels and calculate a compensation value operable to reduce or eliminate the wheel torque felt by the user when pushing or pulling the wheelchair. Embodiments reduce the amount of time and frustration it takes for a user to finely position the wheelchair at a desired location.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheelchair system comprising:
a wheelchair comprising:
one or more wheels,
at least one actuator coupled to the one or more wheels
a processing device,
a sensor communicatively coupled to the processing device and configured to detect an immovable object and an undesirable object, and
a storage medium in communication with the processing device, wherein the storage medium comprising one or more programming instructions that, when executed, cause the processing device to:
determine a wheel torque on the one or more wheels,
determine a compensation value, and
actuate the at least one actuator applying the compensation value to the one or more wheels to remove at least a portion of the wheel torque such that less external force is required to physically move the wheelchair than when the compensation value is not applied,
wherein when a detection of the immovable object occurs, the compensation value is added by the at least one actuator to permit a fine manual motion of the wheelchair and when a detection of the undesirable object is determined, the compensation value is removed.

2. The wheelchair system of claim 1, further comprising:
a wheelchair weight sensor in communication with the storage medium and the processing device,
wherein the compensation value is based at least in part on a weight of the wheelchair and a weight of a user.

3. The wheelchair system of claim 1, further comprising:
a surface sensor in communication with the storage medium and the processing device,
wherein the compensation value is based at least in part on a type of surface that the one or more wheels are in contact with.

4. The wheelchair system of claim 1, wherein:
the sensor is a plurality of sensors configured to detect the undesirable object.

5. The wheelchair system of claim 1, further comprising:
a position sensor, wherein the one or more programming instructions further cause the processing device to determine a location of the wheelchair via the position sensor and a global positioning system.

6. The wheelchair system of claim 5, wherein the compensation value is selected based on the location of the wheelchair.

7. The wheelchair system of claim 1, wherein the compensation value is configured to substantially eliminate the wheel torque such that a user may physically move the wheelchair independent from the at least one actuator.

8. The wheelchair system of claim 1, further comprising an input device, wherein actuation of the at least one actuator applying the compensation value is performed in response to an input signal from the input device.

9. A powered wheelchair system comprising:
a powered wheelchair comprising:
a frame;
one or more wheels coupled to the frame,
at least one actuator coupled to the one or more wheels;
a wheelchair weight sensor, an objection detection sensor, and a surface sensor coupled to the frame and communicatively coupled to the processing device, the objection detection sensor configured to detect an immovable object and an undesirable object;
a processing device, and
a storage medium in communication with the processing device, wherein the storage medium comprising one or more programming instructions that, when executed, cause the processing device to:
determine a wheel torque on the one or more wheels based on a weight of the powered wheelchair, a weight of a user, and a type of surface in contact with the one or more wheels,
determine a compensation value based on the determined wheel torque, and
actuate the at least one actuator applying the compensation value to the one or more wheels to remove the determined wheel torque such that less external force is required to physically move the powered wheelchair than when the compensation value is not applied,
wherein when a detection of the immovable object occurs, the compensation value is added by the at least one actuator to permit a fine manual motion of the powered wheelchair and when a detection of the undesirable object is determined, the compensation value is removed.

10. The powered wheelchair system of claim 9, wherein:
the objection detection sensor is a plurality of sensors configured to detect the undesirable object.

11. The powered wheelchair system of claim 9, further comprising:
a position sensor, wherein the one or more programming instructions further cause the processing device to determine a location of the powered wheelchair via the position sensor and a global positioning system.

12. The powered wheelchair system of claim 11, wherein the compensation value is selected based on the location of the powered wheelchair.

13. The powered wheelchair system of claim 9, wherein the compensation value is determined to eliminate the wheel torque such that the user may physically move the powered wheelchair independent from the at least one actuator.

14. The powered wheelchair system of claim 9, further comprising an input device, wherein actuation of the at least one actuator applying the compensation value is performed in response to an input signal from the input device.

15. A method of operating a powered wheelchair, the method comprising:
determining a wheel torque on one or more wheels of the powered wheelchair;
determining a compensation value based on the determined wheel torque, the compensation value is a value that is equal to or less than the determined amount of wheel torque,
detecting, by an objection detection sensor, an immovable object and an undesirable object, such that when a detection of the immovable object occurs, the compensation value is added by an at least one actuator to permit a fine manual motion of the powered wheelchair, and actuating the at least one actuator applying the compensation value to the one or more wheels to at least partially remove the determined wheel torque.

16. The method of claim 15, the compensation value is configured to substantially eliminate the wheel torque such that a user may physically move the powered wheelchair independent from the at least one actuator.

17. The method of claim 15, wherein the determined wheel torque is based at least in part on a weight of the powered wheelchair, a weight of a user, and a type of surface in contact with the one or more wheels.

18. The method of claim 15, further comprising receiving an input from a user, the input corresponding to a request for physically moving the powered wheelchair by applying the compensation value.

* * * * *

UNITED STATES PATENT AND TRADEMARK OFFICE
CERTIFICATE OF CORRECTION

PATENT NO. : 11,660,240 B2
APPLICATION NO. : 16/894072
DATED : May 30, 2023
INVENTOR(S) : Dario Jose Villarreal Suarez and Sarah Darrow It is certified that error appears in the above-identified patent and that said Letters Patent is hereby corrected as shown below:

In the Specification

In Column 3, Line(s) 6, delete "use may desired" and insert --use may desire--, therefor.

In Column 9, Line(s) 40, after "greater", delete "then" and insert --than--, therefor.

Signed and Sealed this
Fifth Day of December, 2023

Katherine Kelly Vidal
*Director of the United States Patent and Trademark Office*